US009565338B2

(12) United States Patent
Ikari

(10) Patent No.: US 9,565,338 B2
(45) Date of Patent: Feb. 7, 2017

(54) IMAGE PROCESSING APPARATUS, METHOD, AND MEDIUM TO PERFORM IMAGE SMOOTHING AND BRIGHTNESS CORRECTION TO REMOVE SHOW THROUGH

(71) Applicant: CANON KABUSHIKI KAISHA, Tokyo (JP)

(72) Inventor: Daiki Ikari, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/745,082

(22) Filed: Jun. 19, 2015

(65) Prior Publication Data
US 2015/0373227 A1    Dec. 24, 2015

(30) Foreign Application Priority Data
Jun. 23, 2014    (JP) .................................. 2014-128621

(51) Int. Cl.
*H04N 1/405*    (2006.01)
*H04N 1/409*    (2006.01)
*G06K 15/02*    (2006.01)

(52) U.S. Cl.
CPC ........ *H04N 1/4095* (2013.01); *G06K 15/1869* (2013.01); *G06K 15/1881* (2013.01); *H04N 1/405* (2013.01)

(58) Field of Classification Search
None
See application file for complete search history.

(56) References Cited

U.S. PATENT DOCUMENTS

| 5,987,185 A * | 11/1999 | Suzuki | H04N 1/409 358/447 |
|---|---|---|---|
| 6,028,966 A * | 2/2000 | Hashimoto | H04N 1/409 382/262 |
| 6,608,941 B1 * | 8/2003 | Suzuki | H04N 1/409 358/3.26 |
| 6,621,595 B1 * | 9/2003 | Fan | H04N 1/4095 358/2.1 |
| 7,043,078 B2 * | 5/2006 | Guleryuz | G06K 9/00456 358/3.27 |
| 7,064,863 B2 * | 6/2006 | Fukuda | H04N 1/4095 358/1.9 |

(Continued)

FOREIGN PATENT DOCUMENTS

| JP | 2011199352 A | * | 10/2011 |
|---|---|---|---|
| JP | 2012-160883 A | | 8/2012 |

*Primary Examiner* — Scott A Rogers
(74) *Attorney, Agent, or Firm* — Canon U.S.A., Inc. IP Division

(57) ABSTRACT

An image processing method includes reading a document on which a halftone-processed image is printed, performing smoothing processing on image data acquired by reading the document, setting a target region of a predetermined size to the smoothed image data and then calculating a degree of variation in signal values of a plurality of pixels included in the target region, determining a brightness correction amount for the target region based on the calculated degree of variation and the signal values of the plurality of pixels included in the target region, and performing brightness correction on the target region in the image data acquired by reading the document, based on the determined brightness correction amount.

16 Claims, 16 Drawing Sheets

(56) References Cited

U.S. PATENT DOCUMENTS

| | | | | |
|---|---|---|---|---|
| 7,170,635 B2* | 1/2007 | Ishiguro | .................... | G06T 5/20 |
| | | | | 358/1.9 |
| 7,170,642 B2* | 1/2007 | Morimoto | .......... | H04N 1/40075 |
| | | | | 358/3.06 |
| 7,590,306 B2* | 9/2009 | Lal | .......................... | G06T 5/002 |
| | | | | 382/275 |
| 7,636,492 B2* | 12/2009 | Maurer | ................ | H04N 1/4095 |
| | | | | 382/264 |
| 7,929,798 B2* | 4/2011 | Subbotin | .................. | G06T 5/20 |
| | | | | 382/275 |
| 8,395,832 B2* | 3/2013 | Iwamoto | ................. | G06T 5/009 |
| | | | | 358/1.9 |
| 8,547,612 B2* | 10/2013 | Okumura | ............. | H04N 1/4095 |
| | | | | 358/3.26 |
| 2001/0050778 A1* | 12/2001 | Fukuda | ................ | H04N 1/4095 |
| | | | | 358/1.9 |
| 2004/0169891 A1* | 9/2004 | Maurer | ................ | H04N 1/4095 |
| | | | | 358/3.26 |
| 2009/0190181 A1* | 7/2009 | Ohkawa | ............... | H04N 1/4095 |
| | | | | 358/3.23 |
| 2015/0256715 A1* | 9/2015 | Ikari | .................... | H04N 1/4095 |
| | | | | 358/3.24 |

* cited by examiner

FIG.10

| VARIANCE VALUE | 0 | 1 | 2 | 3 | ... | 127 | 128 |
|---|---|---|---|---|---|---|---|
| AVERAGE VALUE | 255 | 240 | 230 | 225 | ... | 105 | 100 |

IMAGE PROCESSING APPARATUS, METHOD, AND MEDIUM TO PERFORM IMAGE SMOOTHING AND BRIGHTNESS CORRECTION TO REMOVE SHOW THROUGH

BACKGROUND OF THE INVENTION

Field of the Invention

The present disclosure generally relates to image processing and, more particularly, to an image processing apparatus that can correct an image, an image processing method for the image processing apparatus, and a medium.

Description of the Related Art

When a document is read by using an image reading apparatus (scanner) mounted on a copying machine or a multifunctional peripheral, a problem of "show-through" may occur. The show-through refers to a phenomenon in which, when one side (front side) of the document is read by the image reading apparatus, an image of the other side (back side) of the relevant document is included in the read image. Therefore, "show-through" occurs mainly when a certain image is printed on both sides (front and back sides) of the document to be read by the image reading apparatus. The show-through tends to occur when a high-density image exists on the back side. This phenomenon occurs due to a light amount of a light source when reading an image and a thickness (degree of light transmission) of a medium (paper) of the read document. If the show-through occurs, it becomes hard to recognize each image in the read image, i.e., image quality is degraded.

As a technique for reducing the show-through in a read image, processing for decreasing an overall image density (by intensively applying a "background elimination function") may be used. In this case, however, not only the density of the show-through but also the density of each image existing on the front side of the document will decrease. Therefore, a low-density image may possibly disappear.

Japanese Patent Application Laid-Open No. 2012-160883 discusses a technique for acquiring a variance value for a fixed range including a target pixel and, when the relevant variance value is equal to or less than a predetermined reference value, performing show-through elimination processing. This processing focuses on a point that a low-density portion in an image is expressed with halftone dots, and utilizes a feature that image data for a region expressed with halftone dots indicates a large variance value. On the other hand, show-through components are hard to be expressed with halftone dots when seen from the front side, and thus indicate a small variance value. Therefore, it is determined whether an image includes the show-through components or is a low-density portion on the front side based on whether the variance value is equal to or less than the reference value, and performs the show-through elimination processing only on the show-through components.

However, the technique discussed in Japanese Patent Application Laid-Open No. 2012-160883 has a problem that a region where the show-through elimination is performed successfully and a region where the show-through elimination is not performed successfully are generated within the same halftone dot region depending on a relation between a halftone dot period of a document and a reading optical resolution of the document.

If the reading optical resolution of a document is determined, a sampling frequency for reading pixels in the document is determined. In this case, if the halftone dot frequency in the document is around one-half of the above-described sampling frequency (around the Nyquist frequency), a region where halftone dots are not correctly resolved is generated in the image data of the read document. Accordingly, one halftone dot region of the document simultaneously includes a region where halftone dots are unresolved and a region where halftone dots are resolved, and is divided into a region having a small variance value and a region having a large variance value. As a result, there occurs a problem that a region where the show-through elimination is performed successfully and a region where the show-through elimination is not performed successfully are generated within the one halftone dot region.

SUMMARY OF THE INVENTION

According to an aspect of the present disclosure, an image processing apparatus includes a reading unit configured to read a document on which a halftone-processed image is printed, a smoothing unit configured to perform smoothing processing on image data acquired by the reading unit reading the document, a calculation unit configured to set a target region of a predetermined size to the image data smoothed by the smoothing unit, and calculate a degree of variation in signal values of a plurality of pixels included in the target region, a determination unit configured to determine a brightness correction amount for the target region based on the degree of variation calculated by the calculation unit and the signal values of the plurality of pixels included in the target region, and a correction unit configured to perform brightness correction on the target region in the image data acquired by the reading unit reading the document, based on the brightness correction amount determined by the determination unit.

According to another aspect of the present disclosure, even if the halftone dot frequency in a document is around one-half of the reading sampling frequency of a reading unit which has read the document, the show-through elimination can be performed with a high degree of accuracy on image data acquired by reading the document having the show-through.

Further features of the present disclosure will become apparent from the following description of exemplary embodiments with reference to the attached drawings.

BRIEF DESCRIPTION OF THE DRAWINGS

FIG. 8 is a graph illustrating a relation between a variance value and an average value indicated by occurrence of the show-through.

FIG. 10 is a table illustrating an example of a stored content of a variance value-average value storage unit (lookup table (LUT)).

DESCRIPTION OF THE EMBODIMENTS

Exemplary embodiments of the present disclosure will be described in detail below with reference to the accompanying drawings. The following exemplary embodiments are illustrative and are not meant to limit the scope of the present disclosure.

As an image processing apparatus according to a first exemplary embodiment of the present disclosure, a copying machine 1000 will be described below.
<Apparatus Configuration>
<Appearance of Copying Machine 1000>

Figure 1:
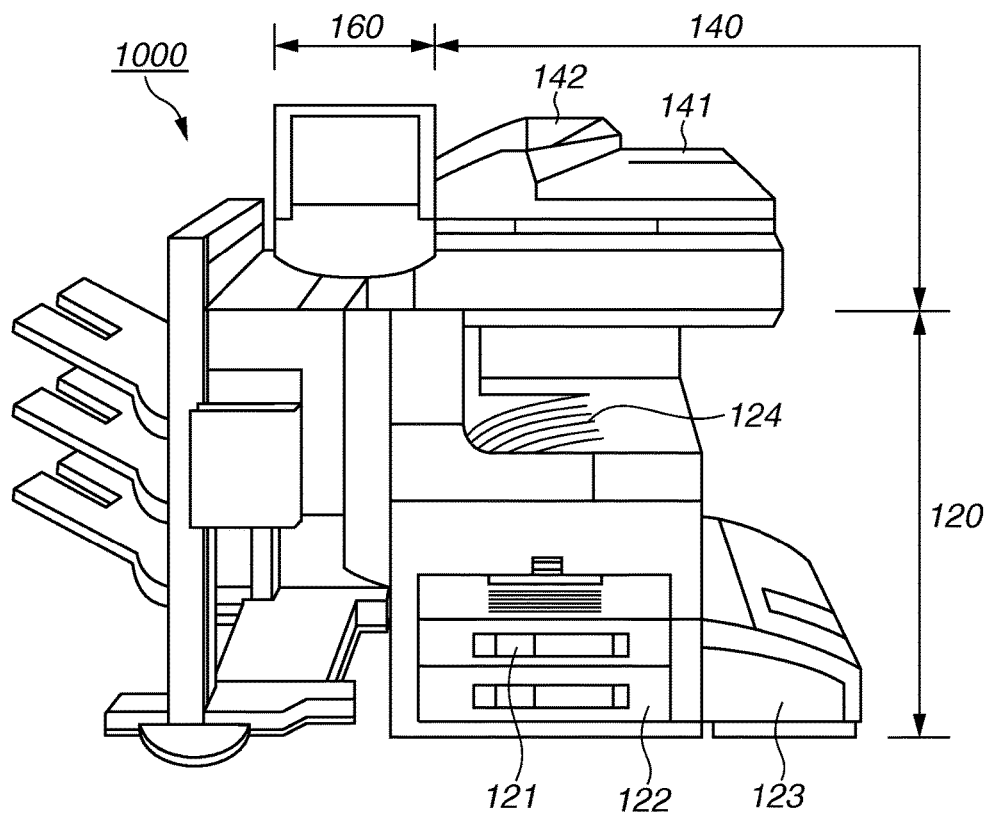
FIG. 1 illustrates an appearance example of a copying machine.

FIG. 1 illustrates an appearance example of the copying machine 1000 according to the present exemplary embodiment. According to a copy instruction received from a user via an operation unit 160, the copying machine 1000 reads a document set in a document feeder 141 by using a scanner unit 140 and then forms a read image on paper by using a printer 120. As used herein, the term "unit" generally refers to any combination of software, firmware, hardware, or other component, such as circuitry, that is used to effectuate a purpose.

The scanner unit 140 serving as an image reading unit performs exposure scanning on an image on the document by using light of an illumination lamp to acquire light reflected off the image, and inputs relevant reflected light to a linear image sensor (charge coupled device (CCD) sensor) to convert image information into an electric signal. The scanner unit 140 further converts the electric signal into a luminance signal composed of red (R), green (G), and blue (B) colors, and outputs the luminance signal to a controller 200 (described below) as image data.

The document is set on a tray 142 of the document feeder 141. When the user instructs to start a document reading operation from the operation unit 160, the controller 200 sends the document reading instruction to the scanner unit 140. Upon reception of the document reading instruction, the scanner unit 140 feeds a document sheet from the tray 142 of the document feeder 141 one by one and then performs a document reading operation. Further, a document sheet may also be placed on a platen glass (described below) for the document reading operation.

The printer 120 is an image forming device for forming image data received from the controller 200 on paper. The following descriptions will be made on the premise that the printer 120 performs image forming based on the electrophotographic method using photosensitive drums, developing units, a fixing unit and the like. The electrophotographic method refers to a method for transferring and fixing toner adhering to photosensitive drums onto paper. The printer 120 is provided with a plurality of paper cassettes 121, 122, and 123 to support different paper sizes and different paper orientations. Printed paper is discharged onto a discharge tray 124.
<Scanner Unit>

Figure 2:
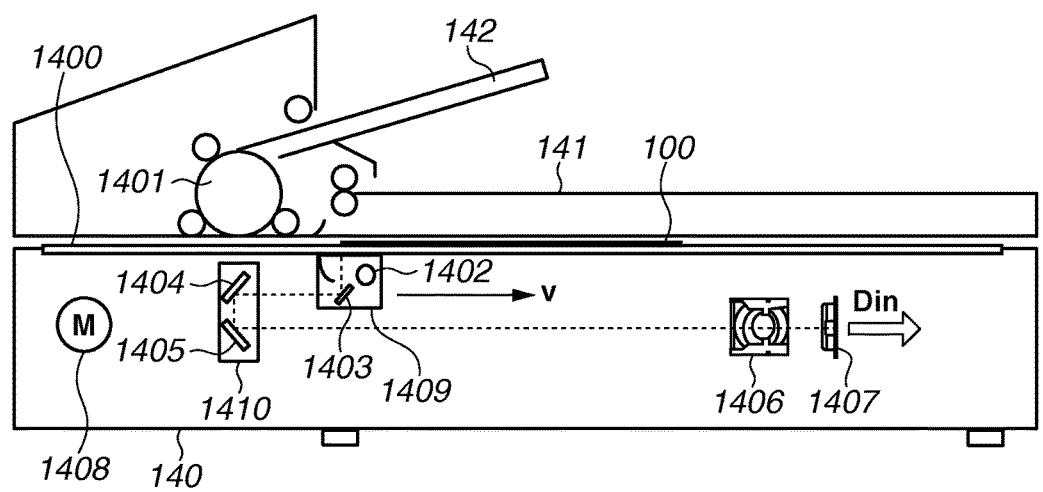
FIG. 2 illustrates a structure example of a scanner unit.

FIG. 2 is a sectional view illustrating a structure of the scanner unit 140. More specifically, FIG. 2 illustrates a main configuration of the scanner unit 140 including a linear image sensor.

A document sheet 100 to be read is placed on a platen glass 1400. The document sheet 100 is irradiated with light of an illumination lamp 1402. Relevant reflected light passes through mirrors 1403, 1404, and 1405 and then is focused onto a CCD sensor 1407 by a lens 1406. A first mirror unit 1409 including the mirror 1403 and the illumination lamp 1402 moves at a speed v. A second mirror unit 1410 including the mirrors 1404 and 1405 moves at a speed 1/2v. Thus, the front side of the document sheet 100 is scanned. The first mirror unit 1409 and the second mirror unit 1410 are driven by a motor 1408. The CCD sensor 1407 converts input reflected light into an electrical signal. The electric signal of a relevant pixel is converted into digital data by an analog-to-digital (A/D) converter (not illustrated) and then is input to the controller 200 (described below) as a pixel signal Din.

By changing the speed of the first mirror unit 1409 and the speed of the second mirror unit 1410, it is possible to change a reading resolution in the moving direction of the mirror units 1409 and 1410 (sub scanning direction). For example, when the reading resolution in the sub scanning direction is 600 dots per inch (dpi), the reading resolution is changed to 300 dpi by moving each of the first mirror unit 1409 and the second mirror unit 1410 at speed twice the original speed.

Further, the scanner unit 140 can also perform a document reading operation in the "feeding-document reading" mode by operating the document feeder 141. In the feeding-document reading mode, the document sheet 100 is first placed on the tray 142 and then is conveyed from the tray 142. Then, the document sheet 100 once passes through the surface of the platen glass 1400 (a portion under a driving roller 1401) by the driving roller 1401 and subsequently reaches the document feeder 141. In the feeding-document reading mode, an optical system including the first mirror unit 1409 and the second mirror unit 1410 stays at a fixed position and does not move. More specifically, when the document sheet 100 is conveyed to the position under the driving roller 1401 by the driving roller 1401, the first mirror unit 1409 fixed to the position under the driving roller 1401 reads the document sheet 100. In the feeding-document reading mode, since the document sheet 100 only needs to be moved in a fixed direction, a large volume of document sheets can continuously be read at a high speed.

In this case, the reading resolution in the moving direction (sub scanning direction) of the document sheet 100 can be changed by changing the conveyance speed of the document sheet 100. For example, when the reading resolution in the sub scanning direction is 600 dpi, the reading resolution is changed to 300 dpi by moving the document sheet 100 at a speed twice the original speed. In this case, since the conveyance speed of the document sheet 100 is doubled, productivity becomes twice as high as that with a reading resolution of 600 dpi.

With a linear image sensor of a certain type, the reading resolution in the main scanning direction (the longitudinal direction of the sensor) can be changed to 300 dpi or 600 dpi according to a setting.

There is a case where a certain image such as a photograph, a graph, and a text may be printed not only on the front side of the document sheet 100 to be read (the side irradiated with light of the illumination lamp 1402) but also on the side not to be read (back side). In this case, "show-through" may occur, in which an image on the side not to be read (back side) affects read image data on the front side. This phenomenon may occur in either of the above-described reading modes. A degree of the show-through depends on a thickness (transmission rate of light) of the medium of the document sheet 100, such as paper, and a light amount emitted by the illumination lamp 1402. Generally, the degree of the show-through becomes more significant, the thinner the document paper is, and the larger a light amount with which the document is irradiated is. Further, the degree of the show-through is also affected by a density value of an image printed on the back side. More specifically, the denser the printed image is, the more the show-through tends to occur.

<Hardware Configuration of Copying Machine>

Figure 3:
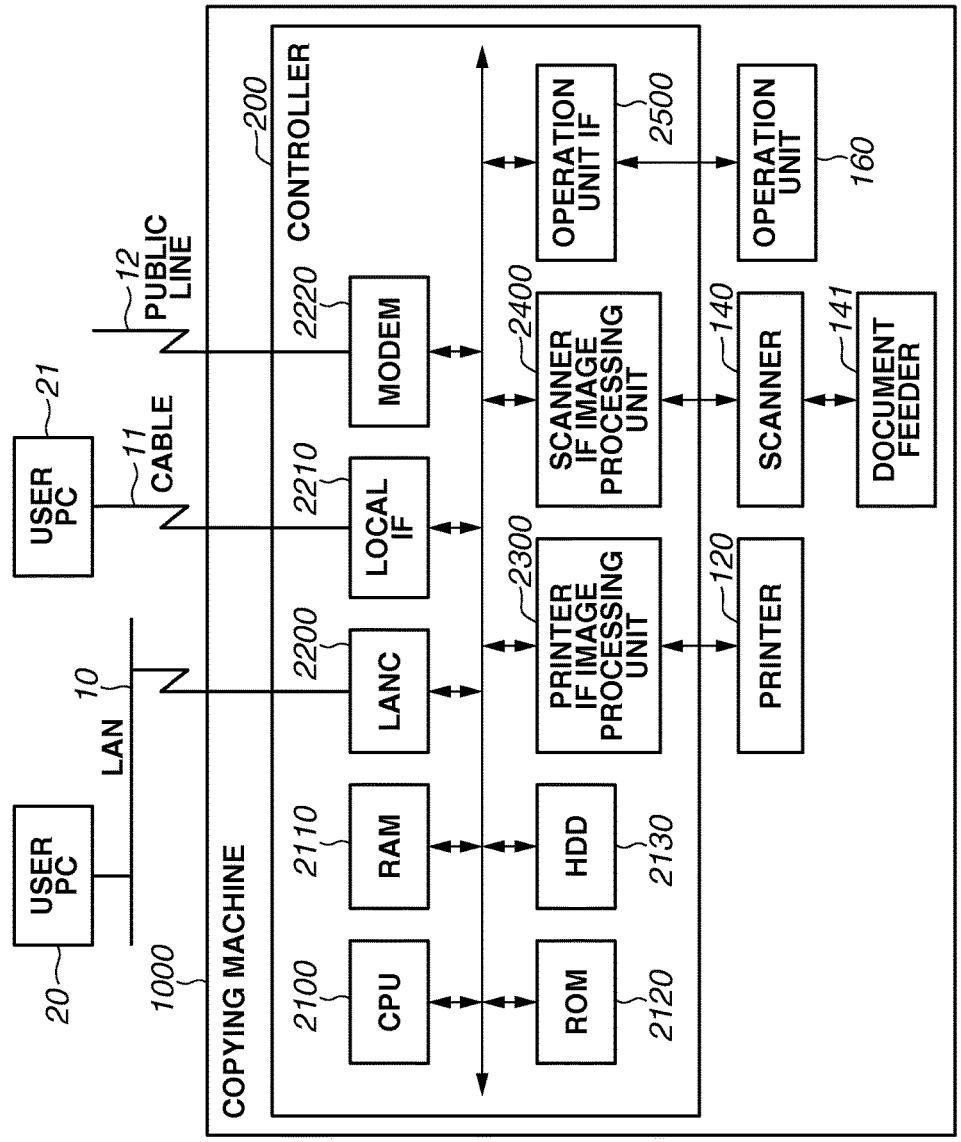
FIG. 3 is a block diagram illustrating a configuration of a controller.

FIG. 3 illustrates a hardware configuration example of the copying machine 1000. The controller 200 is connected to the scanner unit 140 serving as an image input device, the printer 120 serving as an image output device, a local area network (LAN) 10, and a public line (wide area network (WAN)) 12 to totally control operations of the copying machine 1000 and perform input/output control on image information and device information.

A central processing unit (CPU) 2100 is a processor for controlling the entire copying machine 1000. For example, the CPU 2100 totally controls access to various connected devices based on control programs stored in a read only memory (ROM) 2120. Further, the CPU 2100 totally controls various image processing performed inside the controller 200. A random access memory (RAM) 2110 serves not only as a system work memory but also as an image memory for temporarily storing image data or the like. The ROM 2120 is a boot ROM for storing a system boot program. A hard disk drive (HDD) 2130 mainly stores information (system software) to activate and operate a computer, and image data. These pieces of data may be stored not only in the HDD 2130 but also in a recording medium capable of retaining stored contents even if power is turned off.

A LAN controller 2200 connects the copying machine 1000 to the LAN 10 to input and output "output image data" and information about apparatus control to and from a user personal computer (PC) 20. A local interface (IF) 2210 is an interface such as a universal serial bus (USB) or Centronics interface, and is connected to a user PC 21 via a cable 11 to input and output data. A modulator-demodulator (MODEM) 2220 connects the copying machine 1000 to the public line 12 to exchange data to between the copying machine 1000 and a PC on a remote location (not illustrated).

A printer IF image processing unit 2300 is connected to the printer 120 to communicate with a CPU included in the printer 120. The printer IF image processing unit 2300 further performs synchronous/asynchronous conversion on image data and image processing for print output according to an instruction from the CPU 2100. A scanner IF image processing unit 2400 is connected to the scanner unit 140 to communicate with a CPU included in the scanner unit 140. The scanner IF image processing unit 2400 further performs synchronous/asynchronous conversion on image data and image processing such as show-through correction processing (described below). An operation unit IF 2500 is an interface to output from the controller 200 to the operation unit 160 image data to be displayed on the operation unit 160. The operation unit IF 2500 is also an interface to output to the controller 200 information input by the user via the operation unit 160.

<Scanner Image Processing Unit>

Figure 4:
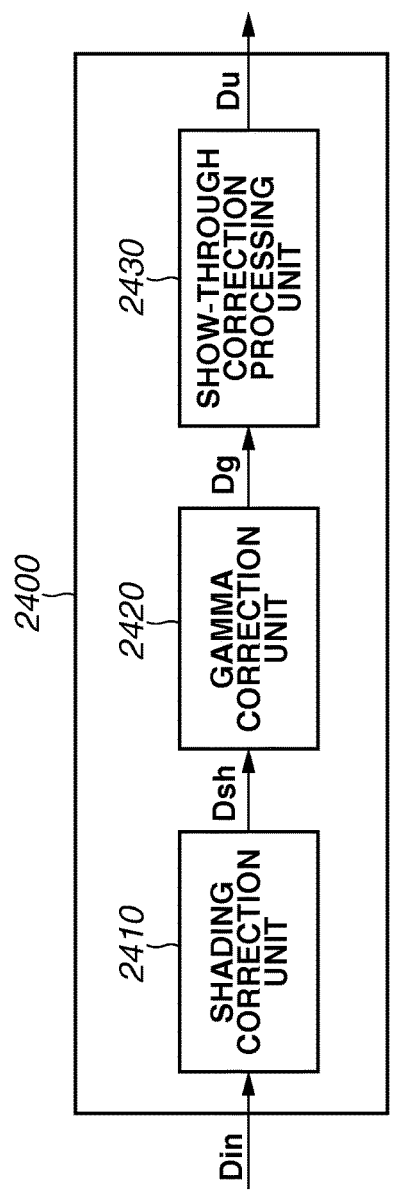
FIG. 4 is a block diagram illustrating a configuration example of a scanner interface (IF) image processing unit according to a first exemplary embodiment.

FIG. 4 is a block diagram illustrating a configuration of the scanner IF image processing unit 2400 according to the first exemplary embodiment. A shading correction unit 2410 receives the pixel signal Din (refer to FIG. 2) which indicates the luminance output by the scanner unit 140. The shading correction unit 2410 performs correction processing on luminance unevenness due to characteristics of an optical system and an image pick up system to produce an image having uniform brightness, by using a publicly known. The pixel signal Dsh having undergone shading correction processing is output to a gamma correction unit 2420 in the subsequent stage.

The gamma correction unit 2420 performs correction for compensating difference in color characteristics between a reading element and an apparatus, by using a publicly known technique. A pixel signal Dg having undergone gamma correction processing is output from the scanner IF image processing unit 2400 and then is written and temporarily stored in the RAM 2110. Further, in parallel with this operation, the pixel signal Dg is output to a show-through correction processing unit 2430.

If the show-through has occurred in read image data on the front side of the document read by the scanner unit 140, the show-through correction processing unit 2430 performs processing for reducing the show-through. The show-through correction processing unit 2430 performs both generation of show-through correction information (index for show-through correction) and show-through correction processing based on the show-through correction information. A pixel signal Du having undergone the show-through correction processing is output from the scanner IF image processing unit 2400 and then is written and temporarily stored in the RAM 2110 by a memory controller (not illustrated).

<Show-Through Correction Processing Unit>

Figure 5:
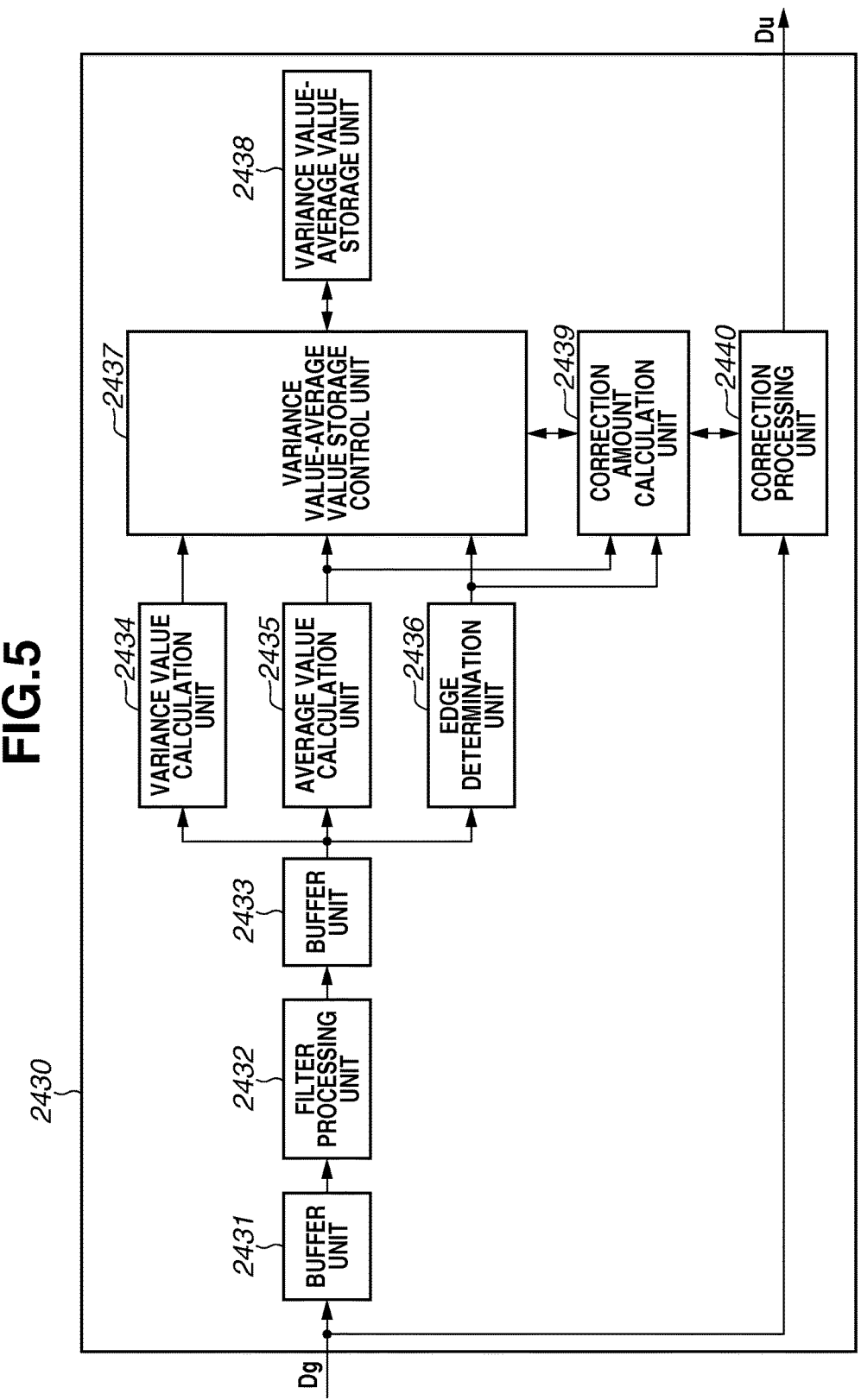
FIG. 5 is a block diagram illustrating a configuration example of a show-through correction processing unit according to the first exemplary embodiment.

FIG. 5 is a block diagram illustrating a configuration of the show-through correction processing unit 2430 according to the present exemplary embodiment. A buffer unit 2431 temporarily stores the pixel signal Dg. The pixel signal Dg is acquired by reading a document on which a halftone-processed image such as dither-processed image is printed. The buffer unit 2431 is used to refer to pixel signals in a window having a predetermined size centering on a target pixel in calculation of the variance and average values of brightness components (e.g., luminance) and edge determination performed in the subsequent stage. For example, when referring to pixel signals in a 5×5 window in processing in the subsequent stage, the buffer size is based on a 5-line configuration. In the case of a 7×7 window, the buffer size is based on a 7-line configuration.

Figure 6:
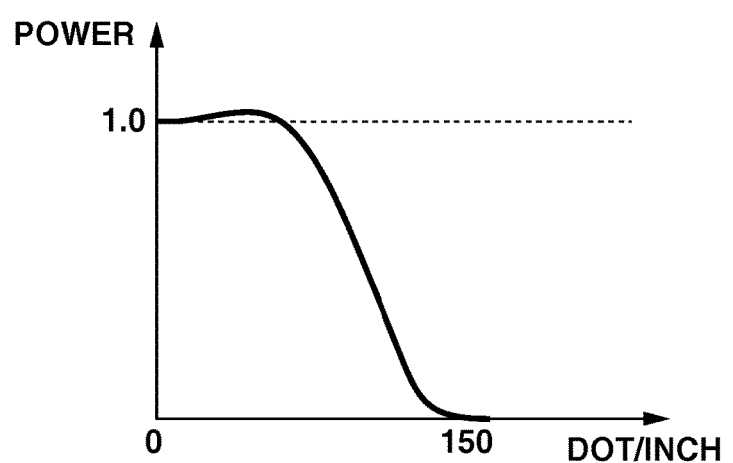
FIG. 6 is a graph illustrating filter characteristics according to the first exemplary embodiment.

A filter processing unit 2432 collectively receives from the buffer unit 2431 pixel signals for the window size for filter processing and then performs the filter processing. This filter processing is performed to prevent occurrence of variation in correction amounts for show-through elimination (described below) within the same halftone dot region on the document. Therefore, even if the halftone dot frequency in the document is around one-half of the reading sampling frequency (around the Nyquist frequency) determined by the reading resolution of the scanner unit 140, halftone dot components in the read document data can be reduced by the filter processing. A design example of filter characteristics used for this filtering processing is illustrated in FIG. 6. Referring to FIG. 6, the horizontal axis indicates dpi (dot/inch) and the vertical axis indicates power of the filter output. In the example described below, an image is read with an optical resolution of 300 dpi in the sub scanning direction. In this case, one-half of the sampling frequency (Nyquist frequency) in the sub scanning direction is 150 dpi. Therefore, components around one-half of the reading sampling frequency (around the Nyquist frequency) can be reduced by performing the filter processing for reducing components around 150 dpi as illustrated in FIG. 6 on pixel components in the sub scanning direction. When reading an image with an optical resolution of 300 dpi in the main scanning direction, similar filter processing may be performed on pixel components in the main scanning direction. Further, to read an image with a different resolution, it is desirable to perform filtering processing for reducing the Nyquist frequency component determined according to the resolution. The pixel signal on which the filtering processing has been performed is output to a buffer unit 2433.

The buffer unit 2433 temporarily stores the pixel signal on which the filter processing has been performed. The buffer unit 2433 is used to refer to pixel signals in a window having a predetermined size centering on the target pixel in calculation of the variance and average values and edge determination performed in the subsequent stage. For example, when referring to pixel signals in a 5×5 window in processing in the subsequent stage, the buffer size is based on a 5-line configuration. In the case of a 7×7 window, the buffer size is based on a 7-line configuration.

A variance value calculation unit 2434 collectively receives from the buffer unit 2433 pixel signals for the window size for calculation and then performs the calculation of the variance value (degree of variation). For example, the variance value is calculated by Formula (1) described below.

$$\text{Variance value } (\sigma^2) = \frac{1}{N} \sum_{k=1}^{N} (x_k - x_a)^2 \qquad \text{Formula (1)}$$

N denotes the number of pixels in the target window, $X_k$ denotes the signal value of the k-th pixel in the target window, and $X_a$ denotes the average value of signal values of pixels in the target window. Instead of the variance value ($\sigma^2$) which tends to be large, the standard deviation value ($\sigma$) may be applied.

An average value calculation unit 2435 collectively receives from the buffer unit 2433 pixel signals for the window size for calculation and then performs the calculation of the average value as a representative value representing pixel values for the relevant window size. For example, the average value is calculated by Formula (2) described below.

$$\text{Average value } (x_a) = \frac{1}{N} \sum_{k=1}^{N} x_k \qquad \text{Formula (2)}$$

Definitions of the parameters are to the same as those for Formula (1). Setting is made so that the window size for the average value calculation and the window size for the variance value calculation are common.

An edge determining unit 2436 collectively receives from the buffer unit 2433 pixel signals for the window size for calculation and then determines whether the target pixel belongs to an edge region. The edge determination may be performed by using a publicly known technique. More specifically, the technique applies a Prewitt filter or a Sobel filter to a window centering on the target pixel, and determines the calculation result by using a predetermined threshold value to determine whether an image edge exists in the relevant region.

A variance value-average value storage control unit 2437 controls writing and reading of data to and from a variance value-average value storage unit 2438. The variance value-average value storage unit 2438 stores the average value for each variance value in the form of a lookup table (LUT). For example, the variance value serves as an address of the LUT, and the average value corresponding to the variance value is stored as data in the relevant LUT address. First, the variance value-average value storage control unit 2437 refers to the edge determination result output by the edge determining unit 2436 to determine whether the target pixel belong to an edge region. When the target pixel is determined to belong to the edge region, the variance value-average value storage control unit 2437 does not write data to the variance value-average value storage unit 2438. On the other hand, when the target pixel is determined not to belong to the edge region, the variance value-average value storage control unit 2437 refers to the variance value output by the variance value calculation unit 2434 to read the average value stored in a location in the variance value-average value storage unit 2438 corresponding to the relevant variance value. More specifically, the variance value-average value storage control unit 2437 accesses the LUT address identical to the variance value calculated by the variance value calculation unit 2434 to read relevant data (average value). Then, the variance value-average value storage control unit 2437 compares the readout average value with the average value calculated by the average value calculation unit 2435. When the average value output by the average value calculation unit 2435 is larger than the readout average value, the variance value-average value storage control unit 2437 writes the larger average value in the variance value-average value storage unit 2438. In other words, the variance value-average value storage control unit 2437 updates the readout data of the LUT address with the larger value. Further, the variance value-average value storage control unit 2437 outputs the average value read out from the variance value-average value storage unit 2438 to a correction amount calculation unit 2439.

The average value read out from the variance value-average value storage unit 2438 indicates the brightest average value in image regions which have previously been processed until the target pixel currently being processed is obtained in the input image. This brightest average value serves as the show-through correction information (index for show-through correction) according to the present exemplary embodiment.

Figure 7:
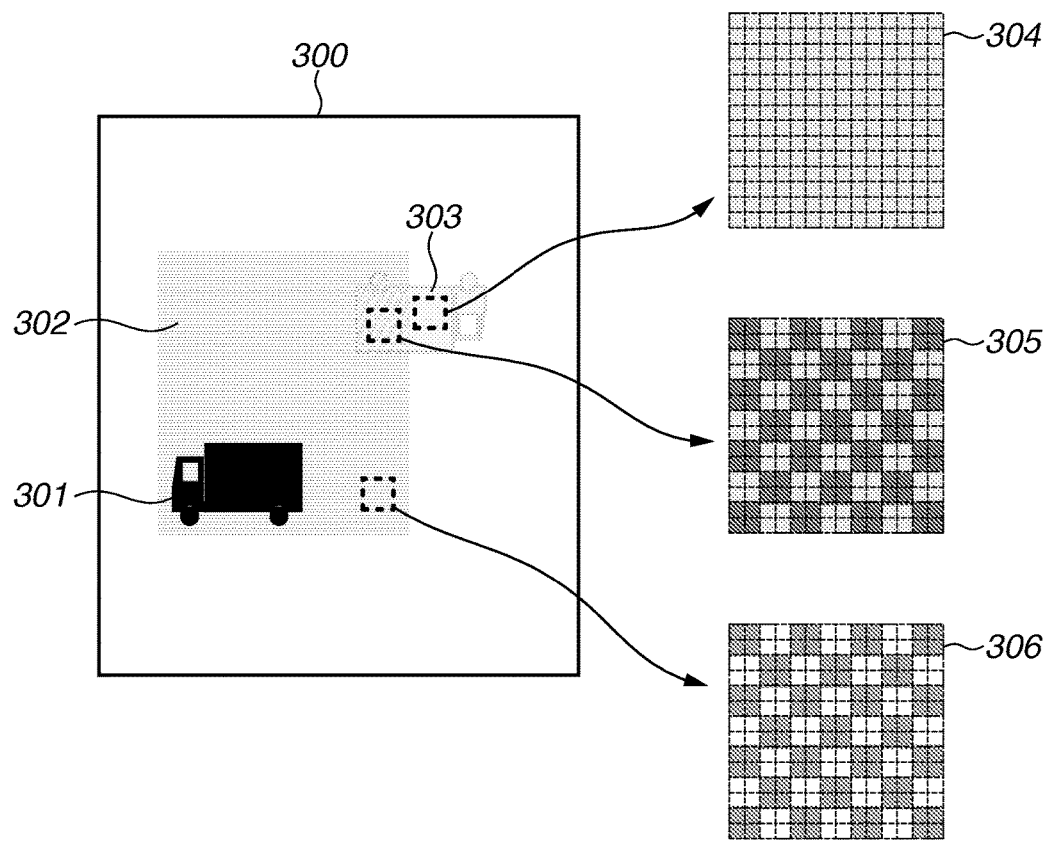
FIG. 7 illustrates examples of show-through occurring in image reading by a scanner.

Detailed meaning of the data (show-through correction information) stored in the variance value-average value storage unit 2438 will be described below with reference to FIG. 7. FIG. 7 illustrates an example of read image data 300 on the front side of the document sheet 100 read by the scanner unit 140. Only a high-density image 301 (image of a truck) and a halftone image 302 (rectangle image) expressed by halftone dots are formed on the front side of the document sheet 100. Further, an image similar to the high-density image 301 is formed on the back side (the side opposite to the side read by the scanner unit 140) of the document sheet 100. In this case, the high-density image existing on the back side of the document sheet 100 has appeared as a show-through image 303 (reversed image of the truck) in the read image data 300 read by the scanner unit 140. Features of each region of the read image data 300 will be described below.

FIG. 7 illustrates a halftone target region 306 which is an enlarged version of a region in the halftone image 302. The halftone target region 306 has a halftone dot structure and therefore includes regions having a halftone dot and regions without a halftone dot on a pixel basis. Each dotted line in the halftone target region 306 indicates a boundary between read pixels. More specifically, in the example illustrated in FIG. 7, each of a region having a halftone dot and a region without a halftone dot appears in units of 2 pixels. In other words, one period of halftone dots has a width of 4 pixels. FIG. 7 illustrates an example in which the halftone dot frequency in the document is about ¼ of the sampling frequency determined by the reading resolution. When the halftone target region 306 is divided into windows with a predetermined window size, and the variance and average values of pixel densities are calculated, a variance value of "X2" and an average value of "Y2" are acquired.

FIG. 7 illustrates a show-through target region 304 which is an enlarged version of a region in the show-through image 303. When the show-through target region 304 is divided into windows with a predetermined window size, and the variance and average values of the pixel density are calculated, a variance value of "X1" and an average value of "Y3" are acquired. In this case, the variance value "X1" acquired from the show-through target region 304 is a small value. This is because, generally, only low-frequency components of an image on the back side tend to appear as show-through components (image components acquired after transmission through paper). Therefore, even if the image on the back side corresponding to the show-through image 303 is drawn with halftone dots, show-through components tend to appear without density (luminance) unevenness. As a result, a small variance value is acquired.

In the read image data 300, when a paper white region in which no image or show-through exists is divided into windows with a predetermined window size, a variance value of "X1" and an average value of "Y4" are acquired. As described above, since show-through components hardly affects the variance value, the variance value of the paper white region and the variance value acquired from a region of the show-through image 303 tend to be similar values. Therefore, a common value of "X1" is used as the variance value here.

FIG. 7 illustrates an overlapping target region 305 which is an enlarged version of a region where the halftone image 302 overlaps with the show-through image 303. The overlapping target region 305 has a halftone dot structure and therefore includes regions having a halftone dot and regions without a halftone dot on a pixel basis. However, the overlapping target region 305 is affected by the show-through image 303, having dark (low luminance) pixel values as a whole. When the overlapping target region 305 is divided into windows with a predetermined window size, and the variance and average values are calculated, a variance value of "X2" and an average value of "Y1" are acquired. As described above, since show-through components hardly affects the variance value, the variance value for the overlapping target region 305 and the variance value acquired from the halftone target region 306 of the halftone image 302 without the show-through are similar values. Therefore, a common value of "X2" is used as the variance value here.

Figure 8:
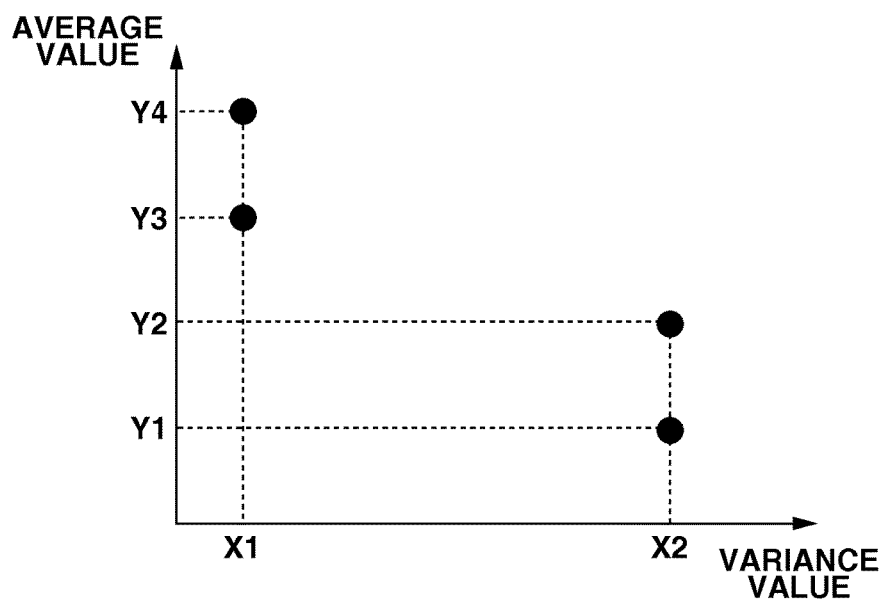

FIG. 8 illustrates a relation between the variance values X1 and X2 and the average values Y1, Y2, Y3, and Y4 of brightness components (e.g., luminance) in the read image data 300. Referring to FIG. 8, coordinates (X1, Y4) indicate the paper white region, coordinates (X1, Y3) indicate the show-through target region 304, coordinates (X2, Y2) indicate the halftone target region 306, and coordinates (X2, Y1) indicate the overlapping target region 305. More specifically, the paper white region has coordinates (X1, Y4), and the paper white region in which the show-through occurs has coordinates (X1, Y3). The halftone target regions 306 has coordinates (X2, Y2), and the halftone region in which the show-through occurs has coordinates (X2, Y1). The average values illustrated in FIG. 8 are average values of brightness (e.g., luminance). The average value Y4 indicates higher luminance than the average value Y1.

Therefore, in the show-through target region 304, signal values of the show-through region are corrected to signal values of the paper white region by correcting the target pixel using a difference between Y3 and Y4, and thus the show-through is corrected as appropriate. In the overlapping target region 305, signal values of the overlapping region are corrected to signal values of the halftone target region 306 by correcting the target pixel using a difference between Y1 and Y2, and thus the show-through is corrected as appropriate. In other words, in each variance value, the average value of a region without the show-through can be used as a target value (i.e., the show-through correction information) for correcting the show-through.

In this case, the variance value of brightness components depends on a halftone dot amount in the target region. The halftone dot amount represents a ratio of the number of significant pixels in a target region to the total number of pixels in the relevant target region in percentage (0 to 100%). The halftone dot amount is determined uniquely according to the image density. This means that, even in a case of generation of a show-through region or a region where the show-through overlaps with halftone dots on the front side, the show-through can be corrected as appropriate by correcting the signal values, targeting the average value in a case of no show-through for each variance value. "Storing the average value for each variance value" means "storing the average value for each halftone dot amount".

However, to acquire an appropriate target value, the average value in the case of no show-through needs to be acquired. To simply and appropriately acquire the target value, the largest average value for each variance value in the input image data is used as a target value, as described above regarding the variance value-average value storage control unit 2437. This utilizes the point that a region without the show-through indicates a higher (i.e., brighter) average value than a region with the show-through. It is rare that, in the input image data, the entire halftone dot region is included in a show-through region. Since a halftone dot region without the show-through exists in almost all cases, the above-described technique is sufficiently applicable to practical use.

Further, appropriate show-through correction information can be stored even in a case where, as in the present exemplary embodiment, the show-through correction information is the brightest average value in image regions which have previously been processed until the target pixel currently being processed is obtained in the input image. This is because it is rare that only show-through regions continue in an actual document. Therefore, the present exemplary embodiment is considered to be applicable to practical use.

Referring to FIG. 5, the correction amount calculation unit 2439 calculates a correction amount for correcting the pixel signal Dg. More specifically, the correction amount calculation unit 2439 performs processing for calculating a difference between the average value received from the variance value-average value storage control unit 2437 and the average value in the current target region calculated by the average value calculation unit 2435 and then setting the calculated difference as a correction amount. In this case, when the difference is a negative value, the correction amount calculation unit 2439 determines that the average value in the target region is higher than the average value stored in the variance value-average value storage control unit 2437 and therefore sets the correction amount to 0. The correction amount calculation unit 2439 outputs this correction amount to a correction processing unit 2440.

The correction amount calculation unit 2439 further refers to the edge determination result output by the edge determining unit 2436 to determine whether the target pixel belongs to an edge portion. When the target pixel is determined to belong to an edge portion, the correction amount calculation unit 2439 sets the correction amount to 0. Alternatively, the correction amount calculation unit 2439 may set a predetermined correction amount. For example, the correction amount calculation unit 2439 may refer to the correction amount of a non-edge portion in proximity to the target pixel and output the relevant correction amount to the correction processing unit 2440.

Then, based on the correction amount received from the correction amount calculation unit 2439, the correction processing unit 2440 performs show-through correction processing on the input pixel signal Dg. The show-through correction processing, for example, adds the correction amount to the luminance value of the pixel signal Dg to make the pixel signal Dg brighter (higher). In this case, if the input pixel signal is a pixel signal in the case of no show-through, the difference decreases and the correction amount also decreases. In addition, instead of simply adding the correction amount, the correction processing unit 2440 may correct the pixel signal Dg by changing a gain applied to the pixel signal Dg according to an input pixel signal value. For example, the higher the input pixel signal value is, the more influence is given by the show-through. Therefore, the correction processing unit 2440 may apply a gain according to the brightness of the pixel signal (i.e., the pixel signal corresponding to the brightness). More specifically, the higher the pixel signal is, the more intensively the pixel signal Dg is corrected. The corrected pixel signal value Dg is stored again in the RAM 2110 as the pixel signal value Du.

On an image boundary such as an edge portion of the image, the variance value acquired through calculation processing by the variance value calculation unit 2434 may be affected by a different image region and become a value irrelevant to the halftone dot amount. In the present exemplary embodiment, therefore, the edge determining unit 2436 performs edge detection so as not to perform the show-through correction on a region in which an edge exists.

Figure 11:
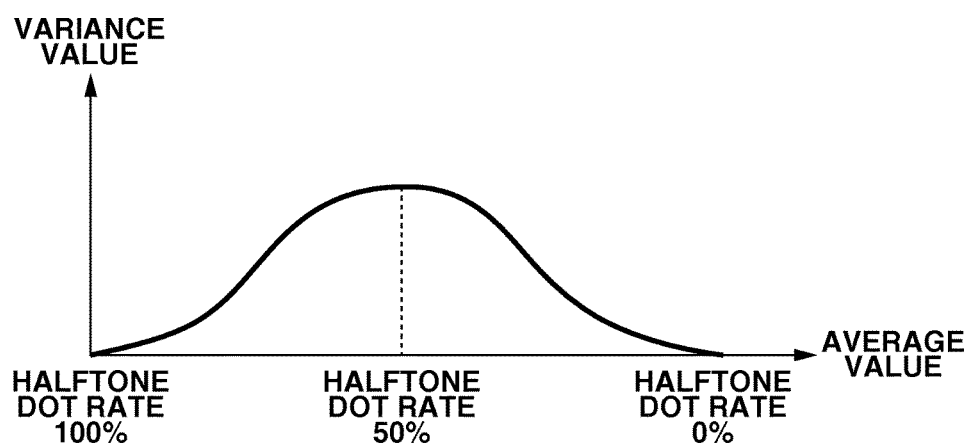
FIG. 11 is a graph illustrating a relation between a halftone dot rate, a variance value, and an average value in a halftone dot image.

The variance value of the read halftone dot image is maximized with a halftone dot rate of 50% in the target region (window size), and provides similar distributions with a halftone dot rate exceeding 50% and a halftone dot rate of less than 50%. The variance value is minimized with a halftone dot rate of 0% or 100%. Variation in variance value is illustrated in FIG. 11. Referring to FIG. 11, an identical variance value occurs with different average values. However, the show-through correction processing may be applied only to a halftone dot rate of less than 50%. More specifically, assuming the average value, which provides the middle density, to be a boundary, only the halftone dot rate equal to or less than the boundary may be subjected to the show-through correction processing. When the density for the average value is equal to or higher than the middle density, the front side provides high density and therefore is hardly affected by the show-through. By performing the processing in this way, a relation between the variance and average values is determined uniquely. Further, as another configuration, a gain for providing a small correction amount may be applied when the density is 50% or higher. These pieces of processing in consideration of the halftone dot amount are implemented by the correction processing unit 2440.

In the present exemplary embodiment, the correction processing unit 2440 performs this processing separately for each color. Therefore, the average value for each variance value is stored in the variance value-average value storage unit 2438 separately for each color. Performing the relevant processing separately for each color enables correction to be performed even with color show-through components (e.g., red character show-through components).

FIG. 10 illustrates an example of a LUT generated in the variance value-average value storage unit 2438. The first row indicates LUT addresses and the second row indicates data stored in each LUT address. Although a LUT address indicates the variance value, it may indicate the standard deviation ($\sigma$) to make numerical values smaller. Similar to the variance value, the standard deviation also indicates variation of data. A relation between the variance and average values stored in the LUT will be described below. For example, if the influence of the show-through is not taken into consideration, the LUT address indicating variance value 0 (address 0) is either a solid-fill or a paper white portion. Since the average value stored in the LUT is the highest (brightest) average value within the image, the average value stored in the LUT address of variance value 0 is inevitably the average value of a paper white portion. With a gradual increase in the variance value (address), the number of pixels for halftone dots in the image increases and accordingly the average value (luminance data) to be stored decreases (becomes darker). Therefore, data to be stored in each address of a LUT formed after referring to one page of the image indicates values as illustrated in FIG. 10.

Further, the LUT may be configured to have the number of dimensions corresponding to the number of colors instead of performing relevant processing separately for each color. For example, when there are 3 colors (R, G, and B), three dimensions are configured with [R variance value], [G variance value], and [B variance value] and the average value is stored for each color.

<About Case where Halftone Dot Frequency is Around Nyquist Frequency of Reading Frequency>

Figure 9:
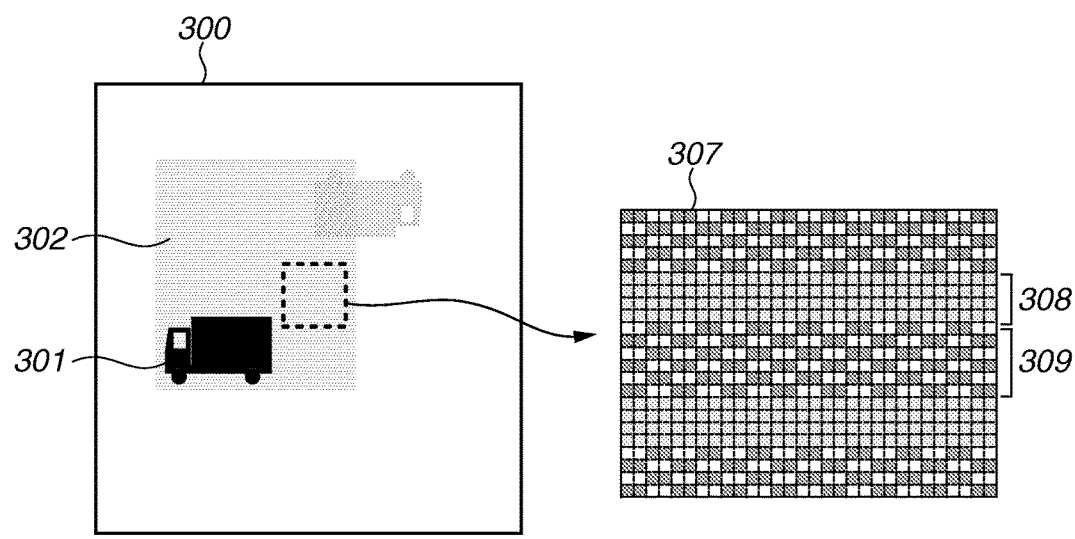
FIG. 9 illustrates a specific example of unresolved halftone dots occurring in image reading.

The following describes a case where the halftone dot frequency of the read document is around the Nyquist frequency of the reading frequency of the scanner unit 140, with reference to FIG. 9. FIG. 9 illustrates an example where a document similar to the document illustrated in FIG. 7 is read with a reading resolution different from the reading resolution illustrated in FIG. 7. Referring to FIG. 9, the reading resolution (dpi) in the sub scanning direction (longitudinal direction of the drawing) is one-half of the reading resolution illustrated in FIG. 7. More specifically, while the reading resolution in the sub scanning direction illustrated in FIG. 7 is 600 dpi, the reading resolution in the sub scanning direction illustrated in FIG. 9 is 300 dpi.

FIG. 9 illustrates a halftone target region 307 which is an enlarged version of a region in the halftone image 302. Referring to FIG. 9, when halftone dots are printed by 200 lines and 45 degrees with respect to the sub scanning direction, the halftone dot frequency in the sub scanning direction is 200×1/$\sqrt{2}$, i.e., 141 lines. In this case, when the reading resolution in the sub scanning direction is 300 dpi and the Nyquist frequency is 150 dpi, a halftone dot frequency of 141 lines (dpi) is around the Nyquist frequency. If the Nyquist frequency and the halftone dot frequency of the reading resolution are close to each other, a region where halftone dots are partially unresolved is generated. Such an unresolved region exists in the halftone target region 307. In the halftone target region 307, an unresolved halftone dot region 308 and a resolved halftone dot region 309 are periodically generated in the sub scanning direction.

When such an image is input to the show-through correction processing unit 2430 and the variance value is calculated as it is, the resolved halftone dot region 309 and the unresolved halftone dot region 308 will provide different variance values and different correction amounts. To prevent this, the filter processing unit 2432 performs filter processing for reducing components around one-half of the sampling frequency (around the Nyquist frequency). Even if regions as illustrated by the resolved halftone dot region 309 and the unresolved halftone dot region 308 exist within the same halftone dot region, almost the same variance value and almost the same correction amount can be obtained.

<Flowchart of Show-Through Correction Pre-Processing>

Figure 12:
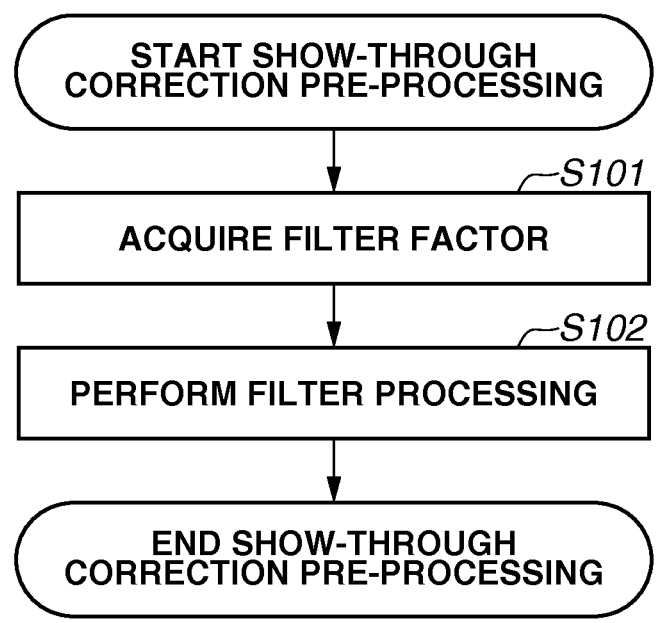
FIG. 12 is a flowchart illustrating an example of show-through correction pre-processing according to the first exemplary embodiment.

FIG. 12 is a flowchart illustrating pre-processing for correcting the show-through (hereinafter referred to as show-through correction pre-processing) in the copying machine 1000 according to the present exemplary embodiment. Even if the halftone dot frequency is around one-half of the reading sampling frequency (around the Nyquist frequency) of the scanner unit 140, by executing this flowchart, a constant correction amount can be obtained within the same halftone dot region. This flowchart is implemented by the CPU 2100 controlling the scanner IF image processing unit 2400 (particularly the show-through correction processing unit 2430) while controlling the scanner unit 140 to read an image of the document sheet 100 according to a program stored in the hard disk drive (HDD) 2130.

In step S101, the CPU 2100 acquires a filter factor. The filter factor reduces components around one-half of the reading sampling frequency determined by a reading optical resolution, and is appropriately selected and acquired according to an optical resolution determined by the scanning mode and various settings.

In step S102, the CPU 2100 sets the filter factor acquired in step S101 to the filter processing unit 2432 and then performs filter processing. As a result, if a component around one-half of the reading sampling frequency determined by the reading optical resolution exists in halftone dot components in the read image, the relevant component is reduced by a filter. The document to be read is a document on which a halftone-processed image such as a dither-processed image is printed.

This is the end of the flowchart of the show-through correction pre-processing. By executing this flowchart, a constant correction amount can be obtained within the same halftone dot region. The show-through correction processing is performed after execution of this flowchart.

<Flowchart of Show-Through Correction Processing>

Figure 13:
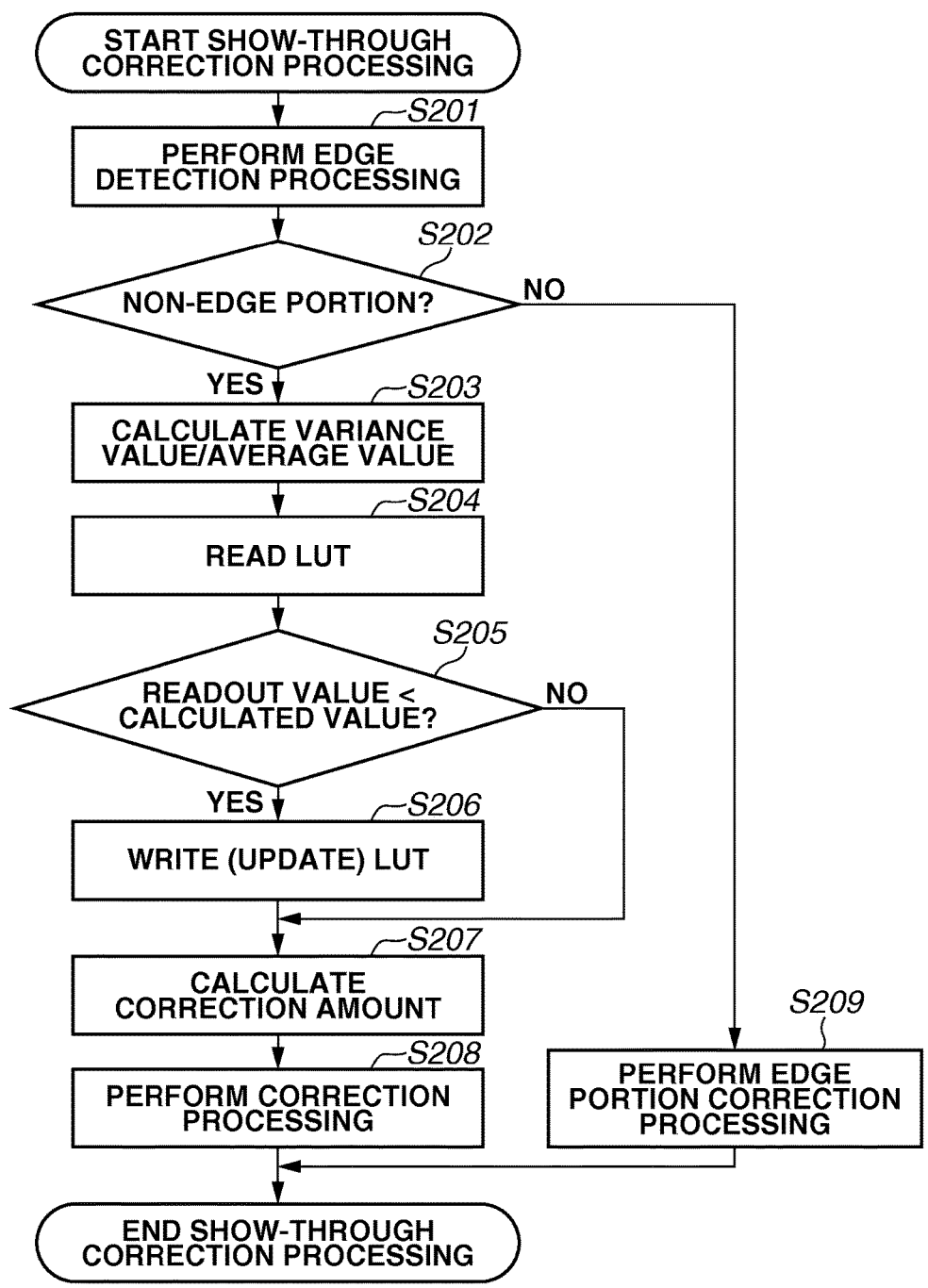
FIG. 13 is a flowchart illustrating another example of show-through correction processing according to the first exemplary embodiment.

FIG. 13 is a flowchart illustrating the show-through correction processing by the copying machine 1000 according to the present exemplary embodiment. This flowchart is implemented by the CPU 2100 executing a program stored in the HDD 2130 to control the scanner IF image processing unit 2400 (particularly the correction processing unit 2440). The CPU 2100 executes this flowchart after completion of the show-through correction pre-processing illustrated in FIG. 12.

In step S201, the CPU 2100 performs edge detection processing on the read image. This processing is performed by the edge determining unit 2436. The CPU 2100 refers to the window (output by the buffer unit 2433) centering on the target pixel of the read image and then performs edge detection by using a publicly known technique.

In step S202, the CPU 2100 refers to the result of the edge detection processing in step S201 to determine whether the target pixel belongs to an edge portion. When the target pixel is determined to belong to an edge portion (NO in step S202), the processing proceeds to step S209. When the target pixel is determined to belong to a non-edge portion (YES in step S202), the processing proceeds to step S203.

In step S203, the CPU 2100 calculates the variance and average values of luminance components in the target window in the read image. This processing is performed by the variance value calculation unit 2434 and the average value calculation unit 2435. The CPU 2100 refers to the window (output by the buffer unit 2433) centering on the target pixel of the read image and then calculates the variance and average values.

In step S204, the CPU 2100 reads data from the LUT in the variance value-average value storage unit 2438. This processing is performed by the variance value-average value storage control unit 2437. The LUT address to be read is the same as the variance value calculated in step S203. The readout data serves as the show-through correction information.

In step S205, the CPU 2100 compares the value read out in step S204 with the average value calculated in step S203 to determine which value is larger. When the value read out in step S204 is larger than the average value calculated in step S203 (NO in step S205), the processing proceeds to step S207. On the other hand, when the average value calculated in step S203 is larger than the value read out in step S204 (YES in step S205), the processing proceeds to step S206.

In step S206, the CPU 2100 writes (updates) data to the LUT address in the variance value-average value storage unit 2438. The data to be written is the average value calculated in step S203, and the LUT address to which data is written is the variance value calculated in step S203.

In step S207, the CPU 2100 calculates the correction amount for the show-through. This processing is performed by the correction amount calculation unit 2439. The CPU 2100 acquires a difference between the show-through correction information read out in step S204 and the average value calculated in step S203, and uses the difference as the correction amount.

In step S208, the CPU 2100 performs the show-through correction processing on the input pixel (the target pixel in step S201). This processing is performed by the correction processing unit 2440. Based on the correction amount calculated in step S207, for example, the CPU 2100 adds the correction amount to a signal value (luminance value) of the input pixel to increase the brightness of the pixel signal Dg. The CPU 2100 may change a gain applied to the signal value of the input pixel according to the correction amount. For example, when the pixel is darker than the middle density, the show-through is less likely to have occurred and therefore the CPU 2100 does not add the correction amount to the pixel signal value. When the pixel is brighter than the middle density, the show-through is highly likely to have occurred and therefore the correction amount is added.

In step S209, when the target pixel is determined to belong to an edge portion in step S202, the CPU 2100 performs edge portion correction processing. For example, the CPU 2100 refers to the correction amount of a non-edge portion in proximity to the target pixel and, similar to step S208, adds the relevant correction amount to the signal value (luminance value) of the input pixel to increase the brightness of the pixel signal Dg.

This is the end of the flowchart of the show-through correction pre-processing. By executing the flowchart illustrated in FIG. 12 and the flowchart illustrated in FIG. 13, it is possible to appropriately correct pixel signal values affected by the show-through regardless of the relation between the halftone dot frequency and the reading optical resolution. Thus, the influence of the show-through in the input image can be reduced.

In the present exemplary embodiment, halftone dot frequency components around one-half of the reading sampling frequency (around the Nyquist frequency) are reduced to maintain a constant show-through correction amount within the same halftone dot region, but the processing is not limited thereto and other processing may be applied. For example, processing for identifying and determining a halftone dot region and other regions similar to image region separation processing may be applied. In this case, if a portion where halftone dots are resolved and a portion where halftone dots are unresolved exist within the same halftone dot region, this causes a negative effect on image processing. Therefore, processing for reducing components around the Nyquist frequency may be performed as pre-processing for the image region separation processing.

In the above-described method and configuration according to the first exemplary embodiment, even if the halftone dot frequency is around one-half of the reading sampling frequency (around the Nyquist frequency) of the document, a constant correction amount can be maintained within the same halftone dot region by performing the filter processing on the image before the show-through correction.

However, the filter processing will also have no small effect on an image of which the halftone dot frequency is not around one-half of the reading sampling frequency (around the Nyquist frequency) of the document. This is because the filter characteristics illustrated in FIG. 6 include an overshoot and a gentle inclination, and thus are not ideal.

In a method and configuration according to a second exemplary embodiment described below, when the halftone dot frequency of the document is around one-half of the reading sampling frequency (around the Nyquist frequency), a constant correction amount is maintained within the same halftone dot region without using the filter processing. Such a configuration aims at reducing the influence of the show-through correction pre-processing on an image of which the halftone dot frequency is not around one-half of the reading sampling frequency (around the Nyquist frequency) of the document. The configuration further enables the implementation cost to be reduced in comparison with the case of the filter implementation.

The present exemplary embodiment differs from the first exemplary embodiment in the internal configuration of the show-through correction processing unit 2430 and the processing flow for the show-through correction pre-processing. The appearance of the copying machine 1000, the configurations of the scanner unit 140 and the scanner IF image processing unit 2400, and the configuration of the controller 200 are similar to those according to the first exemplary embodiment. Differences of the present exemplary embodiment from the first exemplary embodiment will be described in detail below.

<Show-Through Correction Processing Unit>

Figure 14:
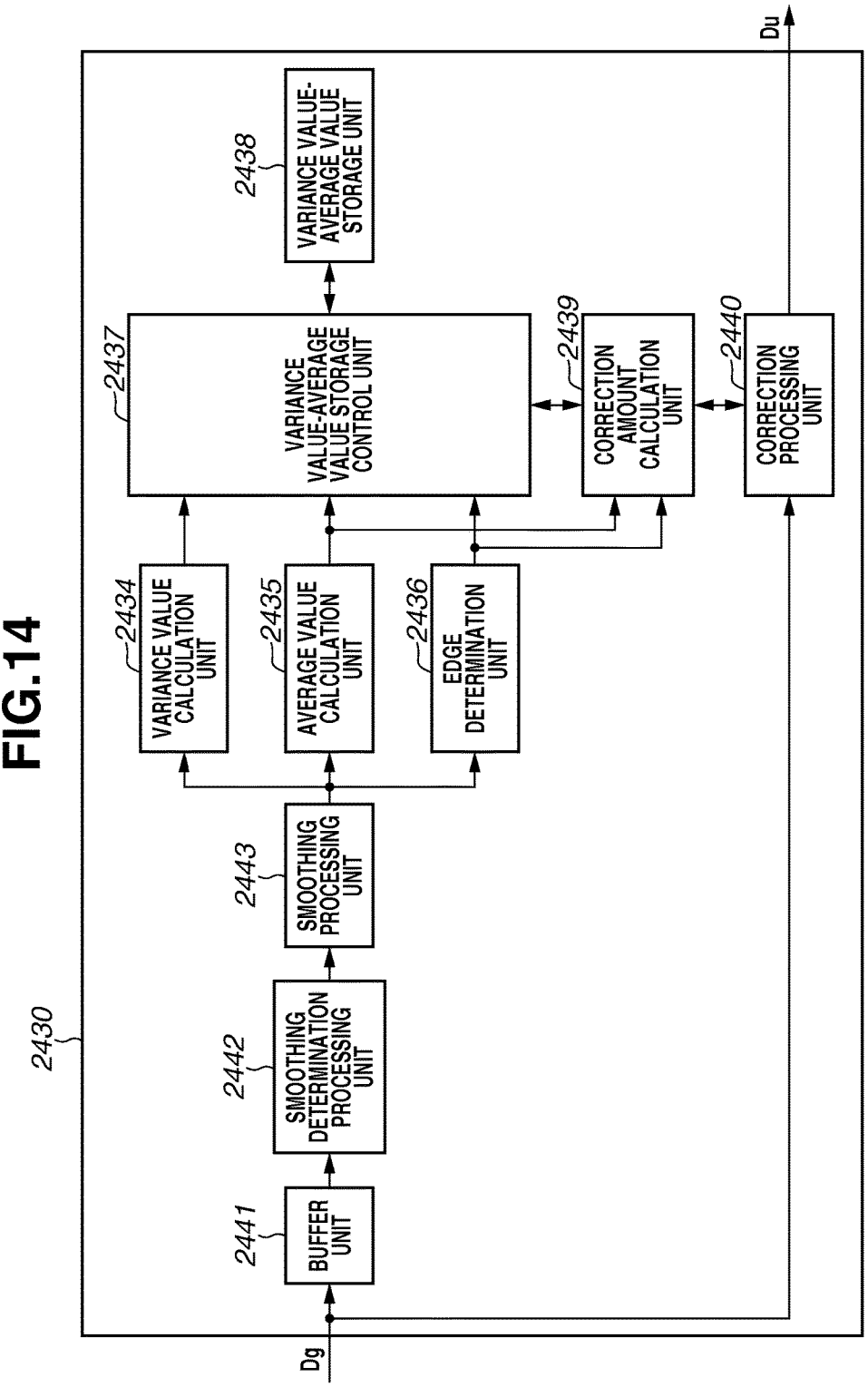
FIG. 14 is a block diagram illustrating a configuration example of a show-through correction processing unit according to a second exemplary embodiment.

FIG. 14 is a block diagram illustrating a configuration of the show-through correction processing unit 2430 according to the present exemplary embodiment.

The buffer unit 2441 temporarily stores the pixel signal Dg. This buffer is used to form a window since it is necessary to refer to the window centering on the target pixel in smoothing determination processing in the subsequent stage. For example, when it is necessary to refer to a 5×5 window in smoothing processing, the buffer size is based on the 5-line configuration. To simplify a configuration, the window size for the smoothing processing and the window size for variance value calculation, average value calculation, and edge determining in the subsequent stage are made common to each other.

A smoothing determination processing unit 2442 collectively receives from the buffer unit 2441 pixel signals for the window size for the smoothing determination processing, and performs the smoothing determination processing. This determination processing determines whether the smoothing processing is to be performed to prevent the occurrence of variation in correction amount for show-through elimination (described below). Therefore, this determination processing simply determines whether components around one-half of the reading sampling frequency (around the Nyquist frequency) determined by the reading optical resolution of the document exist in halftone dot components within the target window in the document. An example of the determination processing is illustrated in FIG. 15.

Figure 15:
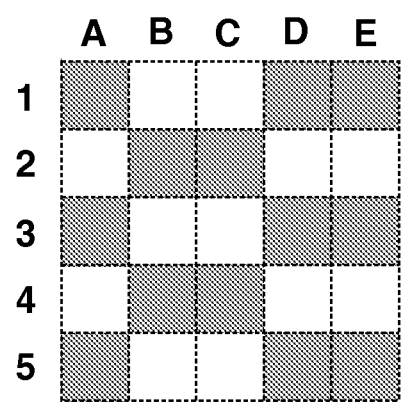
FIG. 15 illustrates an example of window data in a halftone dot image.

FIG. 15 illustrates an example of a case where smoothing determination is to be performed with reference to a 5×5 window. Referring to FIG. 15, a region indicated by dotted lines is a 5×5 window having column numbers A to E and row numbers 1 to 5.

This determination processing aims at determining whether halftone dot components around one-half of the reading sampling frequency (around the Nyquist frequency) exist within the target window in the document. In this case, the processing is to perform the relevant determination on a column basis (or on a row basis).

Described below is a case where a frequency component which is one-half of the reading sampling frequency exists in halftone dot components. In this case, since sampling 2 pixels correspond to 1 period of halftone dots, the presence and absence of a halftone dot switches in units of 1-pixel sampling. Therefore, for example, with respect to a target pixel column, if the luminance value vertically changes centering on the average luminance value in the window in units of 1-pixel sampling, it is possible to simply determine that a frequency component which is one-half of the reading sampling frequency exists in halftone dot components.

Referring to FIG. 15, a halftone dot period in units of 1-pixel sampling can be seen in 5 columns (columns A to E) in the vertical direction. More specifically, it can be determined that the halftone dot frequency around one-half of the sampling frequency (around the Nyquist frequency) is detected in the columns A to E and is not detected in the rows 1 to 5 in the horizontal direction. In this case, the smoothing determination processing unit 2442 transfers information of the column number (or row number) in which the Nyquist frequency has been detected to a smoothing processing unit 2443 in the subsequent stage.

The smoothing processing unit 2443 performs smoothing by using 5×5 window data and the determination result output by the smoothing determination processing unit 2442. In the present exemplary embodiment, the smoothing processing unit 2443 replaces the pixel value of a column (or row) determined to include the halftone dot frequency around one-half of the sampling frequency (around the Nyquist frequency) by the smoothing determination processing unit 2442 with the average value. Therefore, in the example illustrated in FIG. 15, all of the columns A to E are determined to include the halftone dot frequency around the Nyquist frequency, all of pixel values in the 5×5 window are replaced with the average value. If either a column or a row is determined to include the halftone dot frequency around the Nyquist frequency, the relevant pixel value will be replaced with the average value. The replaced 5×5 window data is output to the variance value calculation unit 2434, the average value calculation unit 2435, and the edge determination unit 2436 in the subsequent stage.

The variance value calculation unit 2434 calculates the variance value similarly to the first exemplary embodiment. In this case, even if a halftone dot frequency component around one-half of the sampling frequency (around the Nyquist frequency) exists in the window data, the image data has been smoothed by the smoothing processing unit 2443 in the preceding stage, and therefore the variance value will be calculated as a small value. For example, if the smoothing processing is performed on all of the columns A to E similarly to the example illustrated in FIG. 15, the variance value will become 0.

The remaining block ranging from the average value calculation unit 2435 to the correction processing unit 2440 is similar to that according to the first exemplary embodiment.

<Flowchart of Show-Through Correction Processing>

Figure 16:
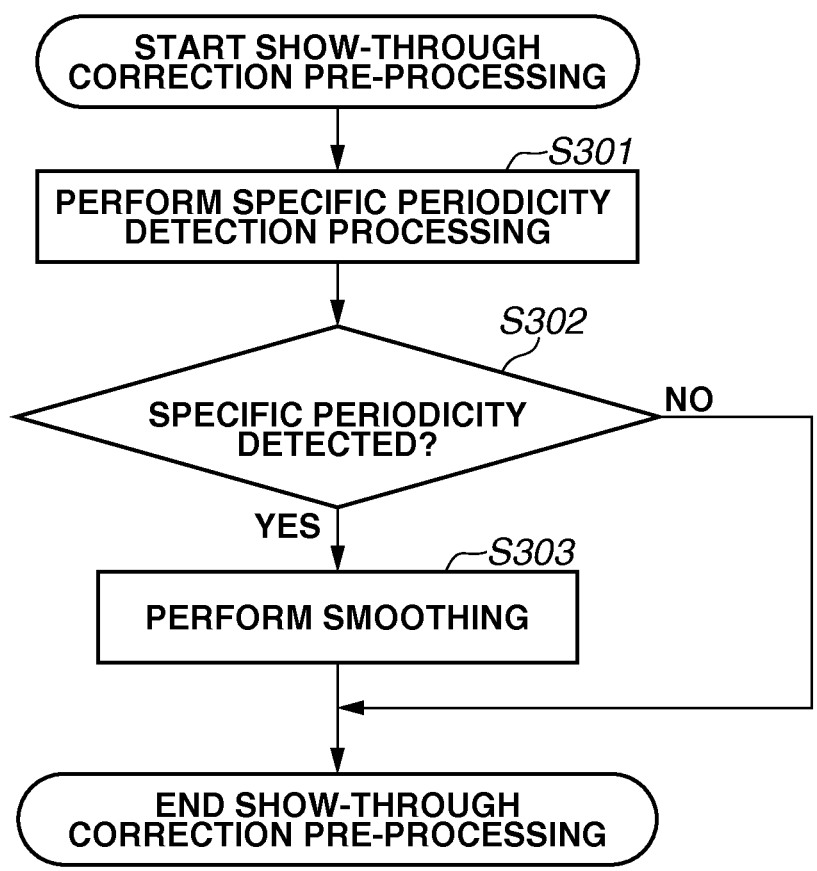
FIG. 16 is a flowchart illustrating an example of show-through correction pre-processing according to the second exemplary embodiment.

FIG. 16 is a flowchart illustrating show-through correction pre-processing performed by the copying machine 1000 according to the present exemplary embodiment. Even if the halftone dot frequency is around one-half of the reading sampling frequency (around the Nyquist frequency) determined by the reading optical resolution, a constant correction amount can be provided within the same halftone dot region by executing this flowchart. This flowchart is implemented by the CPU 2100 controlling the scanner IF image processing unit 2400 (particularly the show-through correction processing unit 2430), while controlling the scanner unit 140 to read an image of the document sheet 100 according to a program stored in the HDD 2130.

In step S301, the CPU 2100 performs specific periodicity detection processing on the read image. The period to be identified is around one-half of the reading sampling frequency (around the Nyquist frequency). This processing is performed by the smoothing determination processing unit 2442. The CPU 2100 refers to the window (output by the buffer unit 2441) centering on the target pixel of the read image to detect periodicity based on variation in luminance centering on the average value.

In step S302, CPU 2100 refers to the result of specific periodicity detection in step S301 to determine whether a halftone dot frequency component around one-half of the sampling frequency (around the Nyquist frequency) is included in the window including the target pixel. When a halftone dot frequency component is determined to be included in the window (YES in step S302), the processing proceeds to step S303. On the other hand, when a halftone dot frequency component is determined to be not included in the window (NO in step S302), the processing exits this flowchart.

In step S303, the CPU 2100 performs the smoothing processing. This processing is performed by the smoothing processing unit 2443. The smoothing processing unit 2443 performs the smoothing processing such as average value replacement on the region within the window in which a halftone dot frequency component around one-half of the sampling frequency (around the Nyquist frequency) is determined to be included in step S302.

This is the end of the flowchart of the show-through correction pre-processing. Similarly to the first exemplary embodiment, the show-through correction processing illustrated in FIG. 13 is performed after execution of this flowchart. Thus, the show-through correction processing is appropriately performed in a state of excluding the influence of halftone dot frequency components around one-half of the reading sampling frequency (around the Nyquist frequency). Thus, the influence of the show-through in the input image can be reduced.

According to the above-described configuration and processing of the present exemplary embodiment, it is possible to perform the smoothing processing in a case where a halftone dot frequency component around one-half of the reading sampling frequency (around the Nyquist frequency) is detected by the specific periodicity detection processing. Accordingly, according to the present exemplary embodiment, the influence of the show-through correction pre-processing on an image of which the halftone dot frequency is not around one-half of the reading sampling frequency (around the Nyquist frequency) of the document can be reduced to a further extent than the filter processing according to the first exemplary embodiment. Further, the window size used for the smoothing determination processing and the window size used for the variance value calculation processing, the average value calculation processing, and the edge determination are made common to each other, and the smoothing processing is performed on the entire window data. By performing processing in this way, the buffers can be integrated into one, and thus the implementation cost can be reduced to a further extent than the filter implementation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-128621, filed Jun. 23, 2014, which is hereby incorporated by reference herein in its entirety.

What is claimed is:

1. An image processing apparatus comprising:
a reading unit configured to read a document on which a halftone-processed image is printed;
a smoothing unit configured to perform smoothing processing on image data acquired by the reading unit reading the document;
a calculation unit configured to set a target region of a predetermined size to the image data smoothed by the smoothing unit, and calculate a degree of variation in signal values of a plurality of pixels included in the target region;
a determination unit configured to determine a brightness correction amount for the target region based on the degree of variation calculated by the calculation unit and the signal values of the plurality of pixels included in the target region; and
a correction unit configured to perform brightness correction on the target region in the image data acquired by the reading unit reading the document, based on the brightness correction amount determined by the determination unit.

2. The image processing apparatus according to claim 1, wherein the smoothing unit performs the smoothing processing on the image data by using a filter for reducing a halftone dot frequency around a Nyquist frequency of a reading sampling frequency determined by a reading resolution of the reading unit.

3. The image processing apparatus according to claim 1, wherein the determination unit further refers to a signal value of a target pixel in the target region to determine the brightness correction amount in such a manner that the brightness correction amount becomes smaller as a luminance component of the signal value of the target pixel becomes darker.

4. The image processing apparatus according to claim 1, wherein the degree of variation is a variance value of luminance components of the plurality of pixels included in the target region.

5. The image processing apparatus according to claim 1, wherein the signal values of the plurality of pixels included in the target region used by the determination unit is an average value of luminance components of the plurality of pixels.

6. The image processing apparatus according to claim 1, wherein, when the signal values of the plurality of pixels included in the target region are lower than a predetermined density, the correction unit performs brightness correction on the target region.

7. An image processing method comprising:
reading a document on which a halftone-processed image is printed;
performing smoothing processing on image data acquired by reading the document;
setting a target region of a predetermined size to the smoothed image data, and calculating a degree of variation in signal values of a plurality of pixels included in the target region;
determining a brightness correction amount for the target region based on the calculated degree of variation and the signal values of the plurality of pixels included in the target region; and
performing brightness correction on the target region in the image data acquired by reading the document, based on the determined brightness correction amount.

8. A non-transitory computer-readable recording medium storing a program that causes a computer to function as each of the units of an image processing apparatus comprising:
a reading unit configured to read a document on which a halftone-processed image is printed;
a smoothing unit configured to perform smoothing processing on image data acquired by the reading unit reading the document;
a calculation unit configured to set a target region of a predetermined size to the image data smoothed by the smoothing unit, and calculate a degree of variation in signal values of a plurality of pixels included in the target region;
a determination unit configured to determine a brightness correction amount for the target region based on the degree of variation calculated by the calculation unit and the signal values of the plurality of pixels included in the target region; and
a correction unit configured to perform brightness correction on the target region in the image data acquired by the reading unit reading the document, based on the brightness correction amount determined by the determination unit.

9. An image processing apparatus comprising:
a scanner which reads a document, the scanner being able to read the document at a specified reading resolution;
a processor; and
a memory storing instructions that, when executed by the processor, cause the image processing apparatus to function as:
an extraction unit configured to extract a region of halftone dots having cycle corresponding to frequency around Nyquist frequency determined based on the specified reading resolution, from image data obtained by reading the document;
a smoothing unit configured to perform smoothing processing on the region of halftone dots extracted by the extraction unit; and
a correction unit configured to perform brightness correction on the region smoothened by the smoothing unit.

10. The image processing apparatus according to claim 9, wherein the extraction unit calculates an average value of brightness from a plurality of peripheral pixels of a target pixel in the image data, and extracts the region of halftone dots having cycle corresponding to frequency around Nyquist frequency according to a determination that a pixel having a value of brightness higher than the calculated average value of brightness and a pixel having a value of brightness lower the calculated average value of brightness in the plurality of peripheral pixels are arranged alternately.

11. The image processing apparatus according to claim 9, wherein the smoothing processing performed by the smoothing unit is processing of replacing a target pixel in the region of halftone dots with an average of a plurality of pixels inside the region of halftone dots.

12. The image processing apparatus according to claim 9, wherein the correction unit performs the brightness correction on the image data obtained by reading the document, the image data including the region smoothened by the smoothing unit.

13. The image processing apparatus according to claim 9, wherein the scanner reads information on a front side of the document, and the correction unit performs, on the smoothened region, correction processing for removing data that contains an image of a back side of the document due to show-through.

14. The image processing apparatus according to claim 9, wherein the document is a document on which a halftone-processed image is printed.

15. An image processing method comprising:
reading a document by a scanner, the scanner being able to read the document at a specified reading resolution;
extracting a region of halftone dots having cycle corresponding to frequency around Nyquist frequency determined based on the specified reading resolution, from image data obtained by reading the document;
performing smoothing processing on the extracted region of halftone dots; and
performing brightness correction on the smoothened region.

16. A non-transitory computer-readable recording medium storing a program that causes a computer to function as each of the units of an image processing apparatus comprising:
a scanner which reads a document, the scanner being able to read the document at a specified reading resolution;
an extraction unit configured to extract a region of halftone dots having cycle corresponding to frequency around Nyquist frequency determined based on the specified reading resolution, from image data obtained by reading the document;
a smoothing unit configured to perform smoothing processing on the region of halftone dots extracted by the extraction unit; and
a correction unit configured to perform brightness correction on the region smoothened by the smoothing unit.

* * * * *